(12) United States Patent
Pasquariello et al.

(10) Patent No.: US 8,355,311 B2
(45) Date of Patent: Jan. 15, 2013

(54) HYBRID OPTICAL DISC

(75) Inventors: Donato Pasquariello, Eindhoven (NL); Philip Steven Newton, Eindhoven (NL); Antoniu Emilius Theodorus Kuiper, Eindhoven (NL); Alexander Marc Van Der Lee, Eindhoven (NL); Anthonius Petrus Gerardus Emanuel Janssen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 906 days.

(21) Appl. No.: 12/092,982

(22) PCT Filed: Nov. 7, 2006

(86) PCT No.: PCT/IB2006/054145
§ 371 (c)(1), (2), (4) Date: May 8, 2008

(87) PCT Pub. No.: WO2007/054892
PCT Pub. Date: May 18, 2007

(65) Prior Publication Data
US 2008/0316892 A1    Dec. 25, 2008

(30) Foreign Application Priority Data
Nov. 14, 2005  (EP) ..................... 05110715

(51) Int. Cl.
*G11B 3/70* (2006.01)
(52) U.S. Cl. ...................... 369/272.1; 369/94
(58) Field of Classification Search .......... None
See application file for complete search history.

(56) References Cited

U.S. PATENT DOCUMENTS

| 5,802,174 A | 9/1998 | Sako et al. |
| 6,537,635 B1 | 3/2003 | Bakos et al. |
| 2002/0172143 A1* | 11/2002 | Lawandy et al. ............. 369/292 |
| 2003/0044006 A1 | 3/2003 | Riddick et al. |
| 2003/0081521 A1 | 5/2003 | Solomon |
| 2004/0137188 A1* | 7/2004 | Lindholm et al. ........... 428/64.1 |
| 2004/0209034 A1 | 10/2004 | Tompson et al. |

(Continued)

FOREIGN PATENT DOCUMENTS
EP    0751517 A2    2/1997
(Continued)

OTHER PUBLICATIONS

International Search Report of International Application No. PCT/IB2006/054145 Contained in International Publication No. WO2007054892.

(Continued)

*Primary Examiner* — Christopher R Lamb

(57) ABSTRACT

An optical storage medium (20) comprises a first data layer (21), for example a Blu-ray (BD) data layer. In addition, the optical storage medium (20) comprises a second data layer (23), for example a DVD data layer. The second data layer (23) is bonded to a substrate (25) using a third layer (27). The third layer (27) comprises an adhesive layer combined with a reactive layer. A reactive agent contained in the reactive layer acts to provide a limited lifetime to the data contained in the second layer (23). The second data layer (23) (i.e. having a limited lifetime) contains access data for controlling access to at least some of the data contained on the first data layer (21). In this way, access to a BD layer can be controlled by a separate DVD layer having a limited lifetime.

13 Claims, 2 Drawing Sheets

U.S. PATENT DOCUMENTS

| | | |
|---|---|---|
| 2005/0005880 A1 | 1/2005 | Bale et al. |
| 2005/0018574 A1 | 1/2005 | Jenkins et al. |
| 2005/0053865 A1 | 3/2005 | Wisnudel et al. |
| 2005/0083829 A1 | 4/2005 | Selinfreund et al. |
| 2006/0114787 A1* | 6/2006 | Festal et al. .................. 369/59.1 |
| 2006/0136948 A1 | 6/2006 | LeBlanc, III et al. |
| 2006/0253692 A1* | 11/2006 | Ferren et al. ....................... 713/1 |

FOREIGN PATENT DOCUMENTS

| | | |
|---|---|---|
| EP | 0767957 B1 | 4/1997 |
| JP | 2001176129 A | 6/2001 |
| JP | 2004109670 A | 4/2004 |
| JP | 2004529452 A | 9/2004 |
| JP | 2008520061 A | 6/2008 |
| WO | WO2004031811 A2 | 4/2004 |
| WO | WO2004057597 A1 | 7/2004 |
| WO | WO2005025707 A1 | 3/2005 |
| WO | 2006053330 A2 | 5/2006 |

OTHER PUBLICATIONS

Written Opinion of the International Searching Authority for International Application No. PCT/IB2006/054145.

* cited by examiner

HYBRID OPTICAL DISC

The invention relates to a hybrid optical disc, and in particular to a hybrid optical disc having a limited lifetime or limited use.

A Blu-ray Disc (BD) is the next generation optical disc format, which has been developed primarily to enable recording, rewriting and playback of high definition video (HD), as well as storing large amounts of data. A single layer Blu-ray Disc can hold 25 GB, which can be used to record over two hours of HDTV, or more than 13 hours of standard definition TV. Dual layer versions of a Blu-ray Disc can hold up to 50 GB of data.

While current optical disc technologies such as DVD, DVD±R, DVD±RW, DVD-RAM and CD use a red laser to read and write data, the Blu-ray format uses a blue-violet laser instead, hence the name Blu-ray.

In order to be backwards compatible with existing optical disc formats, several different hybrid discs and players are being considered, such as hybrid BD discs with CD/DVD, and intra BD hybrid layers with CD/DVD.

FIG. 1 gives an overview of a typical hybrid disc combination. In FIG. 1, the hybrid disc 1 comprises a BD layer 3 (for example a BD-ROM, BD-R or a BD-RE layer). The hybrid disc 1 also comprises a DVD layer 5 (for example DVD-ROM/R/RW/RAM/±R/±RW) and a CD layer 7 (for example CD-ROM/R/RW). These layers are separated by a substrate, for example polycarbonate layers 9, 11 and 13. It will be appreciated that many different combinations of hybrid disc are possible, including discs where either the DVD layer 5 or CD layer 7 is omitted.

The general idea with hybrid discs is that they allow different types of information and content to be separated. In the hybrid disc 1, data such as movies and software can be made available in the BD layer 3 and the DVD layer 5, which means that the hybrid disc 1 can be played in the next generation BD players (using the BD layer 3) or in existing DVD players (using the DVD layer 5). Likewise, the hybrid disc can also be used in a conventional CD player, using the information stored in the CD layer 7.

Another type of known optical disc is the "limited lifetime" or "limited use" disc. An example of such a disc is the "ez-D" disc. A ez-D disc is supplied in a vacuum-sealed package, and when the package is opened the content on the disc can only be played for a limited time.

The ez-D disc works on the principle that a reactive dye is mixed with the adhesive that bonds the DVD layer with a substrate (i.e. polycarbonate layer). The dye goes from a reduced state to an oxidized state when exposed to air. The dye is transparent in the reduced state whereas, in the oxidized state, the dye absorbs wavelengths used for optical writing and reading, thus making the data in the DVD layer unreadable. The governing degradation mechanism is that oxygen diffuses through the substrate and reacts with the reactive dye. Thus, this type of disc provides a limited lifetime or limited use disc, which is achieved by superimposing the data layer with a layer that darkens when in contact with air.

Limited lifetime discs are suited for applications such as movie rental, whereby a customer purchases the movie at a gas-station, supermarket or wherever, and can then choose to watch the movie at a later time. However, once the vacuum seal is broken, the limited lifetime disc only has a predetermined play life. For example, the ez-D only has a 48 hours play lifetime. There is no need to return the ez-D disc to the store, which means that the user can simply dispose of the disc.

In a similar manner to that described above, a reactive dye or a reactive reagent could also be provided in the adhesive layer between the BD layer 3 and the cover layer, or substrate 9. However, for Blu-ray discs, there are more stringent optical requirements for the adhesive layer between the BD layer 3 and cover layer 9, which means that a reactive dye for providing a limited lifetime or limited use BD layer can cause problems during normal playback.

The aim of the present invention is to provide a hybrid disc that enables limited lifetime or limited use of data stored on a layer, such as a BD layer, without having the disadvantages mentioned above.

According to a first aspect of the invention, there is provided an optical storage medium comprising a first data layer and a second data layer, the second data layer being accessible for a limited period of time only. The second data layer is adapted to store access data for controlling access to at least a portion of the first data layer.

The invention has the advantage of enabling data stored in the first data layer, for example a Blu-ray (BD) data layer to have limited lifetime or limited use, but without degrading the quality of the optical reading and/or writing operations to the BD layer during normal use.

Since the access data is able to control access to only a portion of the data stored on the BD layer, this has the advantage that a limited lifetime is only applied to a part of the disc, whereas convention discs become totally inoperable when the dye is oxidized.

According to another aspect of the invention, there is provided a method of providing a limited period of access to data stored on a portion of a first data layer in an optical storage medium. The method comprises the steps of providing a second data layer, providing means for limiting access to the second data layer for a first limited period of time, providing means for limiting access to the second data layer for a second limited period of time, wherein the second limited period of time is different from the first limited period of time, storing access data on the second data layer, the access data controlling access to the portion of the first data layer, extracting the access data from the second layer, permanently transferring the access data to a player prior to the expiration of at least one of the first and second limited periods of time during which the second layer is accessible.

For a better understanding of the invention, and to show how more clearly how it may be carried into effect, reference will now be made, by way of illustration only, to the following drawings in which.

Figure 1:
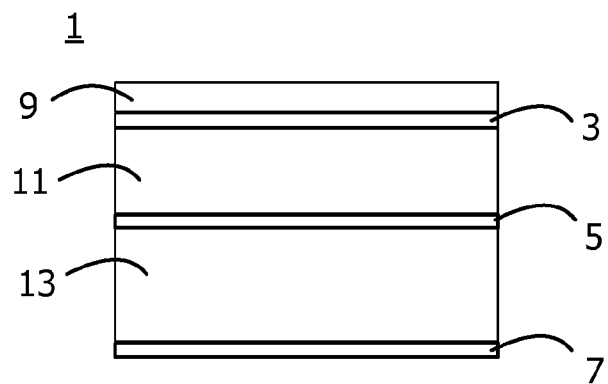
FIG. 1 shows a conventional hybrid disc.
Figure 2:
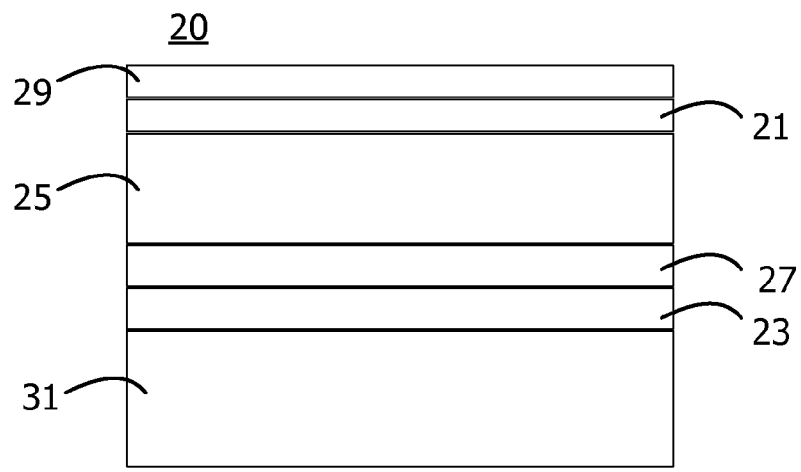
FIG. 2 shows a hybrid disc according to the present invention.

FIG. 2 shows an optical storage medium 20 according to the present invention. The optical storage medium 20 comprises a first data layer 21, for example a BD data layer. In addition, the optical storage medium 20 comprises a second data layer 23, for example a DVD data layer. The second data layer 23 is bonded to a substrate 25 using a third layer 27. The third layer 27 comprises an adhesive combined with a reactive agent. The reactive agent in the third layer 27 acts to provide a limited lifetime to the data contained in the second layer 23. Preferably, the optical storage medium 20 also comprises a cover layer 29, for example a polycarbonate layer for covering the first data layer 21, and a substrate 31, for example a polycarbonate layer.

The second data layer 23 (i.e. having a limited lifetime) contains access data for controlling access to at least a portion of the data contained on the first data layer 21. In this way, the access data provides a link between the information on the first data layer 21 and the limited lifetime information contained on the second data layer 23.

The invention has the advantage that a small amount of data stored in the second data layer 23 (DVD data layer) can be used to interact with the large amount of data stored in the first data layer 21 (BD data layer).

As mentioned above, preferably, the access data stored on the second data layer 23 can be used to control access to only a portion of the data stored in the first data layer 21. This has the advantage that only a selected part of the information contained in the first layer 21 can be made to have a limited lifetime. For example, a movie trailer could be removed from the disc after a predetermined time, i.e. corresponding to the time the movie is released.

Alternatively, the access data stored on the second data layer 23 can be used to control access to all of the data stored on the first data layer 21. The invention therefore has the advantage of enabling either a portion or all of the data in the first data layer 21 to have a limited lifetime, whereas the conventional method of providing a reactive agent directly in the adhesive covering the first layer means that all of the data will always become inaccessible.

The access data stored in the second data layer 23 (DVD layer) acts as a form of "content key" for the contents of the first data layer 21 (BD layer). Therefore, using a hybrid disc having a first data layer 21 and a second data layer 23 having a limited lifetime means that the information recorded or stored in the first data layer (e.g. BD-ROM) is provided with an expiration time and date, but without degrading the optical properties of normal playback of the BD layer. This allows content distributors to "rent" the information in the BD layer, meaning that a customer can only access the content during a limited period of time. In the case of a recordable BD layer (R or RE) the limited lifetime content keys in the second data layer 23 allow the user to protect the content by limiting the time during which the data can be read. Therefore, if the disc is stolen from the user, the content in the BD layer can only be accessed for a limited time.

It is noted that the reactive agent used in the third layer 27 can be any reactive agent that has the effect of preventing access to the data stored on the second layer 23 after a predetermined amount of time. It is well known to use various reactive dyes and photo-bleaching agents for this purpose.

Currently, the lifetime of commercial ez-D is 48 hours. According to another aspect of the invention, the lifetime of the disc can be controlled or tuned. This is achieved by providing means for controlling the aging mechanism such that it has a tunable lifetime.

Figure 3:
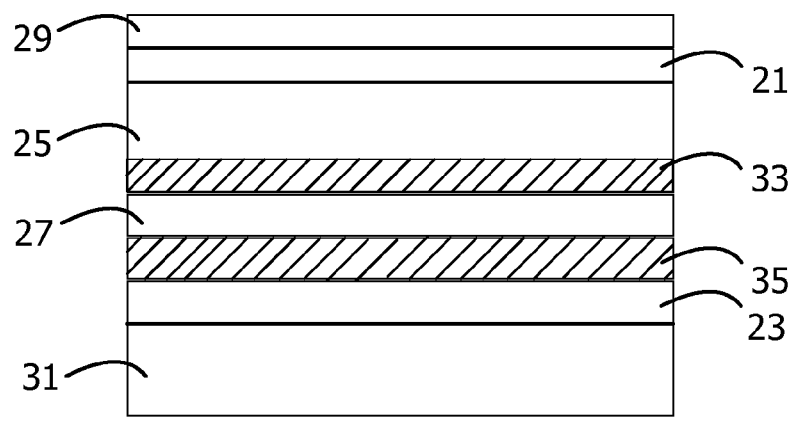
FIG. 3 shows a disc structure according to another aspect of the present invention.
Figure 4:
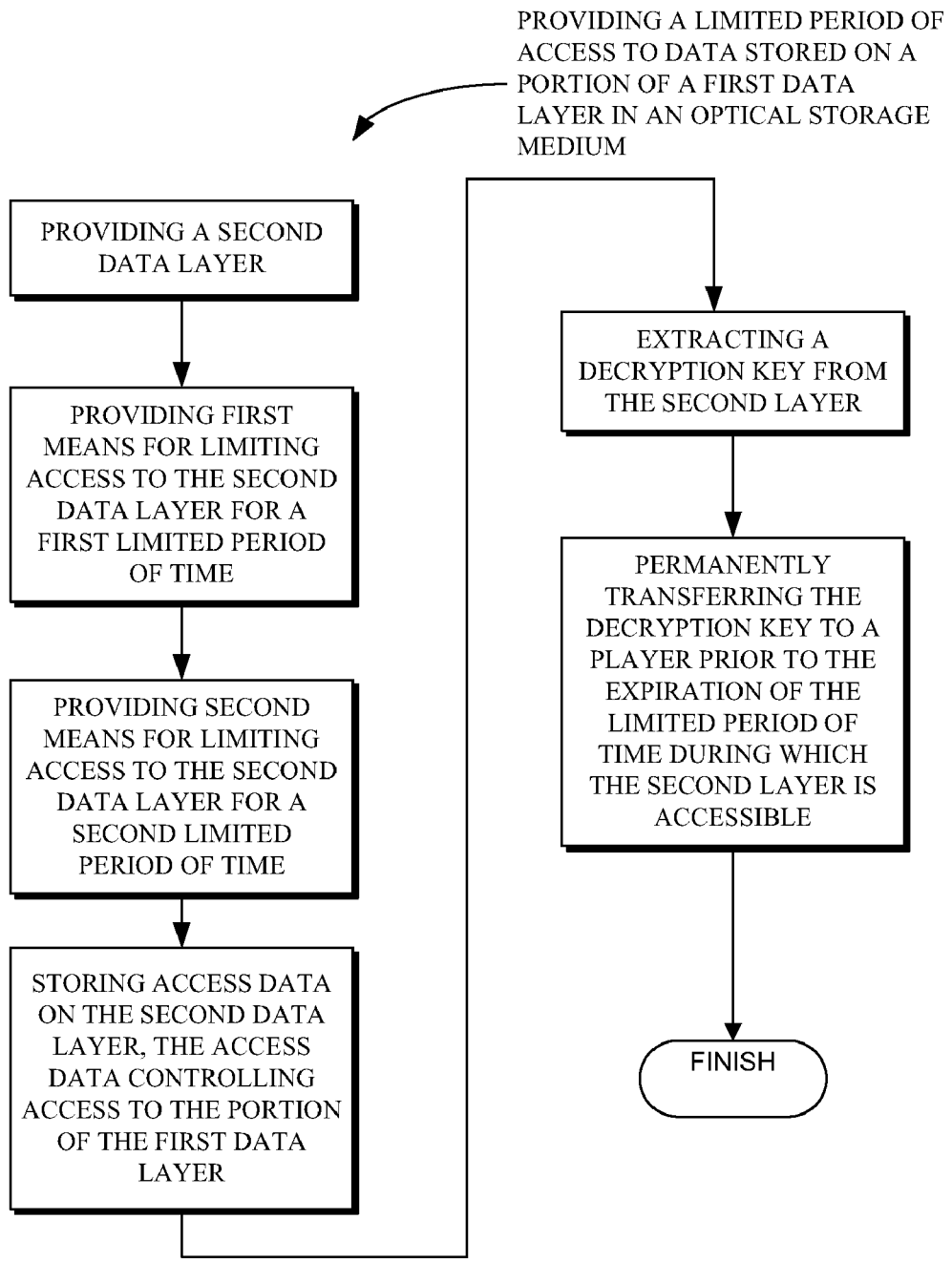
FIG. 4 shows a flow chart of steps for providing a limited period of access to data stored on a portion of a first data layer in an optical storage medium.

FIG. 3 shows a preferred embodiment for tuning the lifetime of the second data layer 23. In a similar manner to FIG. 2, the optical storage medium 20 comprises a first data layer 21, for example a BD data layer, and a second data layer 23, for example a DVD data layer. The second data layer 23 is bonded to a substrate 25 using a third layer 27, comprising an adhesive combined with a reactive agent.

In addition, according to this aspect of the invention, there is provided a diffusion layer 33. The diffusion layer 33 acts as a barrier, and can be configured to tune the lifetime of the second data layer 23. For example, the diffusion layer 33 can be a silicon-nitride layer for limiting the oxygen diffusion or water diffusion from penetrating the reactive layer 27. Furthermore, in addition to having a diffusion layer 33 covering the "topside" of the reactive layer 27, a diffusion layer 35 may also be provided for limiting oxygen diffusion or water diffusion penetrating the reactive layer 27 from the "underside". It will be appreciated that other possibilities are covered by the invention, such as the provision of a diffusion layer 35 without a diffusion layer 33, or in which each diffusion layer only covers part of the reactive layer 27. With the latter, it is possible that one portion of the second data layer 23 (for example the portion containing the access data to the first data layer 21) becomes inaccessible prior to another portion of the second data layer 23.

The diffusion layers 33 and/or 35 act to limit the oxygen or moisture diffusion from air to the aging or reactive layer 27, and thereby limit the oxygen diffusion. According to one embodiment, the lifetime is controlled by varying the thickness of the diffusion layer 33 and/or 35. In other words, the thickness of the diffusion layer 33 and/or 35 controls the amount of oxygen or moisture that reaches the lifetime limited ageing layer 27. Alternatively, the lifetime can also be tuned by varying the amount of reactive additives in the adhesive layer.

Although the embodiment above has been described as having separate diffusion layers 33 and/or 35, it is noted that the diffusion layers 33 and/or 35 may form part of the polycarbonate substrates 25 and/or 31, respectively. In other words, according to this particular embodiment, the aging is controlled by controlling the diffusion of oxygen or moisture through the disc by tuning the porosity of the polycarbonate substrate. In this manner, the lifetime of a disc can be controlled during manufacturing. In other words, once manufactured with a particular diffusion layer 33 and/or 35, the disc has a set lifetime (which can differ from a separate disc manufactured with different diffusion layers).

This aspect of the invention enables new applications, such as licensing software for a certain period, for example months or years. After the license period has expired, the content of the disc is no longer accessible.

It will be appreciated that the invention also embraces other methods of tuning the lifetime of the second data layer 23. For example, spin-coated lacquer layers can be applied to a disc at any interface, even on the surface of the disc. Lacquer layers (for example spin-coated UV curable resin) are often used in optical disc production as an adhesive or as an oxygen and moisture diffusion barrier.

As will be seen from the above, lifetime limited content distribution and limited playtime of recorded data is made possible with the hybrid BD and ez-D optical storage medium. Using the hybrid BD and ez-D storage medium, it is possible to distribute or rent content in the Blu-ray layer for a limited time. For example, by storing software or content keys in the ez-D layer, which has a limited lifetime, it is possible to limit the availability of the content in the BD layer.

For a recordable hybrid Blu-ray disc, recordable or re-writeable, with an ez-D layer, the user can protect the content by placing an "expiration" date on the recorded data. This requires that access to the Blu-ray layer is only made possible by accessing keys in the lifetime limited ez-D layer. For example, the invention makes it possible for a user to buy a recordable hybrid disc, break the vacuum seal, record data onto the hybrid disc, such that the data will then become inaccessible after a certain period of time.

The invention can also be used for archiving very sensitive and secret documents. Such documents are often associated with an expiration date, and where destruction of such documents is a carefully monitored process. Another possible application is the use of the invention for distributing installation software for consumer electronic devices. In such an application, the software will become inaccessible after the software has been used to install the software, thereby preventing the software from being installed on a different device at a later date.

Another application is where the content author wants to ensure that a disc can only be played in a certain player, and cannot be rented out or exchanged. To support this application the ez-D layer can contain keys required to view the content on the BD-Layer. These keys during first play can be copied to the player (BD-Player). After a certain time frame (probably a short time frame), the ez-D layer can no longer be read, which means that the content on the BD layer can only be read in the player which has stored the keys to decrypt the content. These keys can be stored in the player in flash memory, or in some other protected non-volatile storage area. The general idea is that the second data layer may contain data which is only accessible for a limited amount of time for copying to local storage of a player. Once the expiration time/data is reached the encryption data of the second data layer is only accessible in the player, which has a local copy of the encryption data. The "protected" stored keys in the player may be transferred through a secure device to another (new) BD-Player, in essence transferring the rights to view the content on the discs to the other player, however the discs can then no longer be played in the "old" player. This transferring of rights could be a one-way system, or could be limited to a number of times etc.

As an addition the BD-Layer could contain a part that is encrypted with keys stored securely in the BD layer itself. This content can be viewed on a different player and could contain for example a trailer or teaser, this could entice others to also buy the disc. This allows users to freely exchange discs with others and at the same time increase the sales of discs, rather than de-creasing the sales of disc through copying.

Although the preferred embodiment has been described showing the access data for the first data layer being stored in a DVD layer, it is noted that the access data could also be stored in a CD layer.

Also, although the first data layer is described as being a Blu-ray data layer, the first layer could also comprise some other type of layer, such as a HD DVD layer (or similar data layer recorded and/or read using a blue laser), a DVD layer, or a CD layer.

Furthermore, when referring to a particular layer as being a BD layer or a DVD layer, it will be appreciated that such references refer to these layers as being the reflective layer for the format concerned.

It is also noted that while the preferred embodiments show a preferred layout for the various layers in the optical disc, these layers may be interchanged or arranged differently as appropriate. For example, although the diffusion barrier layers 33 and 35 are shown as being arranged directly next to the topside and the underside of the reactive layer 27, the diffusion barrier layer 35 could equally be placed on the underside of the second data layer 23, since this would still limit oxygen or moisture from reaching the reactive layer 27. In a similar manner, the diffusion barrier layer 33 could also be located elsewhere to the topside of the reactive layer 27. It will be appreciated that the term "topside" means the side that is located towards the laser source, whereas the term "underside" means the side located away from the laser source.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. An optical storage medium comprising:
    a first data layer, the first data layer being accessible for an unlimited period of time;
    a second data layer, the second data layer being accessible for a limited period of time only;
    a reactive layer for covering the second data layer, the reactive layer for determining the limited period of time that the second layer is accessible,
    a first diffusion barrier layer located above the reactive layer,
    a second diffusion barrier layer located beneath the reactive layer,
    wherein the first diffusion barrier layer covers a first portion of the reactive layer,
    wherein the second diffusion barrier layer covers a second portion of the reactive layer,
    wherein the first diffusion barrier layer causes a first portion of the second data layer to become inaccessible prior to a second portion of the second data layer,
    wherein the second data layer is adapted to store access data for controlling access to at least a portion of the first data layer; and
    wherein the second layer stores a decryption key that is permanently transferred to a player prior to the expiration of the limited period of time during which the second layer is accessible.

2. An optical storage medium as claimed in claim 1, wherein the access data controls access to the whole of the data stored on the first data layer.

3. An optical storage medium as claimed in claim 1, comprising further means for controlling the limited period of time that the second data layer is accessible.

4. An optical storage medium as claimed in claim 3, wherein the further means for controlling comprise the control of the thickness of the first or second diffusion barrier layer.

5. An optical storage medium as claimed in claim 3, wherein the further means for controlling comprises additives added to the reactive layer.

6. An optical storage medium as claimed in claim 1, wherein the first of second diffusion barrier layer forms part of a substrate.

7. An optical storage medium as claimed in claim 1, wherein the first or second diffusion barrier layers are arranged to cover at least a portion of a topside and/or at least a portion of an underside of the reactive layer.

8. An optical storage medium as claimed in claim 1, wherein the first data layer is recorded and/or read using a blue laser.

9. An optical storage medium as claimed in claim 1, wherein the second data layer is a DVD layer or a CD layer.

10. An optical storage medium as claimed in claim 1, wherein the access data comprises content keys for accessing the content of the first data layer.

11. An optical storage medium as claimed in claim 1, wherein the first portion of the second data layer made inaccessible corresponds to the first portion of the reactive layer covered by the first diffusion barrier layer.

12. An optical storage medium as claimed in claim 1, wherein the second portion of the second data layer made inaccessible corresponds to the second portion of the reactive layer covered by the second diffusion barrier layer.

13. A method of providing a limited period of access to data stored on a portion of a first data layer in an optical storage medium, the method comprising the steps of:
- providing a second data layer:
- providing first means for limiting access to the second data layer for a first limited period of time,
- providing second means for limiting access to the second data layer for a second limited period of time, wherein the first limited period of time is different from the second limited period of time,
- storing access data on the second data layer, the access data controlling access to the portion of the first data layer
- extracting a decryption key from the second layer;
- permanently transferring the decryption key to a player prior to the expiration of the limited period of time during which the second layer is accessible.

* * * * *